United States Patent
Reitmeyer et al.

(10) Patent No.: US 7,103,444 B1
(45) Date of Patent: Sep. 5, 2006

(54) METHOD AND APPARATUS FOR SUPERVISING MANUFACTURING TOOLS

(75) Inventors: Neil A. Reitmeyer, Shohola, PA (US); Chaunese R. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/908,132

(22) Filed: Apr. 28, 2005

(51) Int. Cl.
*G06F 19/00* (2006.01)

(52) U.S. Cl. ............ 700/180; 700/108; 700/174; 340/815.4

(58) Field of Classification Search ........... 700/108, 700/121, 174, 180, 110; 340/815.4, 468, 340/473
See application file for complete search history.

(56) References Cited

U.S. PATENT DOCUMENTS

| | | | |
|---|---|---|---|
| 6,389,325 B1 * | 5/2002 | Rutkowski | 700/180 |
| 6,429,783 B1 * | 8/2002 | Reyes et al. | 340/815.4 |
| 6,671,570 B1 * | 12/2003 | Schulze | 700/121 |
| 6,892,107 B1 * | 5/2005 | Baba et al. | 700/108 |
| 6,950,716 B1 * | 9/2005 | Ward et al. | 700/121 |
| 6,959,225 B1 * | 10/2005 | Logsdon et al. | 700/100 |
| 2003/0061212 A1 * | 3/2003 | Smith et al. | 707/6 |
| 2003/0100971 A1 * | 5/2003 | Sun | 700/108 |
| 2005/0177269 A1 * | 8/2005 | Funk | 700/121 |
| 2006/0069459 A1 * | 3/2006 | Retlich | 700/108 |

* cited by examiner

*Primary Examiner*—Jayprakash N. Gandhi
*Assistant Examiner*—Alexander Kosowski
(74) *Attorney, Agent, or Firm*—Kerry Goodwin (57) ABSTRACT

A system which provides a graphical user interface for monitoring operational status of the tools in the factory is provided. In a factory where many manufacturing tools having individual status reporting formats are operated, the system collects reports from the tools in different formats, translates these into one of ten newly defined statuses, then displays the statuses in a single display monitor so that a supervisor of the manufacturing tools can comprehend these statuses immediately and can take necessary actions appropriately.

11 Claims, 8 Drawing Sheets

| Graphic Image | Key | Status codes from Unit 1 of Tool 110 |
|---|---|---|
| | Resource Up | Status Code 110-00 |
| | | Status Code 110-02 |
| | Resource Unscheduled Down | Status Code 110-10 |
| | | Status Code 110-12 |
| | | Status Code 110-14 |
| | Resource Engineering | Status Code 110-20 |
| | Resource Scheduled Down | Status Code 110-30 |
| PROC | Up, Processing jobs | Status Code 110-40 |
| IDLE | Up, Not processing jobs | Status Code 110-50 |
| | Tool Engineering | Status Code 110-60 |
| ENG | | Status Code 110-62 |
| | | Status Code 110-64 |
| | Tool Down | Status Code 110-70 |
| HEX | Tool in A3 | Status Code 110-80 |
| HEX | Tool not in A3 | Status Code 110-90 |

| Project Name | Process | Tool |
|---|---|---|
| CG1 | WET | 110, 111, 112, 113, 114, 115 |
| | CMP | 116, 117, 118 |
| CYN | RIE | 119, 120, 121 |
| | PLY | 122, 123, 124, 125 |
| CLD | Inslator Deposition | 135, 136, 137, 138 |
| | Metal Deposition | 139, 140, 141, 142 |
| DES | RTP | 143, 144 |
| | Implant | 146, 147, 148, 149, 150 |
| | Test1 | 126, 127 |
| | Test 2 | 145 |
| | Test 3 | 154 |
| DER | Lithography | 128, 129, 130, 131, 132, 133, 134, 155, 156, 157 |

Fig. 4

| Graphic Image | Key | Status codes from Unit 1 of Tool 110 |
|---|---|---|
| | Resource Up | Status Code 110-00 |
| | | Status Code 110-02 |
| | Resource Unscheduled Down | Status Code 110-10 |
| | | Status Code 110-12 |
| | | Status Code 110-14 |
| | Resource Engineering | Status Code 110-20 |
| | Resource Scheduled Down | Status Code 110-30 |
| PROC | Up, Processing jobs | Status Code 110-40 |
| IDLE | Up, Not processing jobs | Status Code 110-50 |
| | Tool Engineering | Status Code 110-60 |
| ENG | | Status Code 110-62 |
| | | Status Code 110-64 |
| | Tool Down | Status Code 110-70 |
| HEX | Tool in A3 | Status Code 110-80 |
| HEX | Tool not in A3 | Status Code 110-90 |

Fig. 5

| Tool ID | Unit ID | Status Code |
|---------|---------|-------------|

METHOD AND APPARATUS FOR SUPERVISING MANUFACTURING TOOLS

BACKGROUND OF THE INVENTION

The present invention relates to a method and system for supervising manufacturing tools in a factory, and more specifically to software which provides a graphical user interface for monitoring operational status of the tools in the factory.

Semiconductor device manufacturing generally includes integrating of various on-wafer processes integrations such as isolation, well formation, gate insulator formation, source/drain formation, plug formation, low-k layer structure formation, wiring and passivation. Further, the respective process integrations comprise unit processes including cleaning, heat treatment, thin layer formation, impurity implantation, lithography and planarization. Accordingly, a number of manufacturing tools are necessary for semiconductor manufacturing.

In typical manufacturing facilities, a plurality of production lines engaged in the manufacture of a variety of different products are maintained, and the number of production lines is constantly increasing. Therefore, the number of manufacturing tools is constantly increasing. For example, a certain semiconductor factory is equipped with three hundred or more tools for the above described unit processes, and the number of subunits, included in the tools, for managing raw materials reaches nine hundred.

The production lines, as well as associated manufacturing tools, are monitored and supervised by distributed or centralized systems provided for the respective production lines.

However, from the aspect of facility and resource management in the entire factory, supervision across production lines of the manufacturing tools may be more desirable because there are tools used in common by several production lines and therefore a status change of a certain manufacturing tool for one line may affect other lines.

In providing a cross-production-line supervising system, a supervisor of the manufacturing tools would find it difficult to monitor the status of the tools, because typically the tools have different status reporting systems where reporting formats are different from each other depending on the types and manufacturers of the tools. As a result, it is difficult to comprehend the operating status of the tools in a factory and take appropriate action immediately.

Accordingly, it is desired to prepare a system for efficiently reporting the status of many tools so that a supervisor of the tools can comprehend the status instantly.

SUMMARY OF THE INVENTION

The present invention provides a system and method for efficiently reporting the status of many manufacturing tools operated in a manufacturing facility.

In accordance with the invention, a system and method are provided for presenting a concise and collective report of status of the manufacturing tools so that a supervisor of the tools can take necessary action such as stop, repair and inspection of the tools in accordance with the report.

In one aspect of the present invention, there is provided a system for displaying status of individual tools running in a factory. The system includes: (a) a unit for receiving an information from one of the tools, the information including a first ID of the tool and a status information of the tool; (b) a unit for retrieving, from a storage device in accordance with the first ID, a second ID of a project under which the tool is supervised in the factory; (c) a unit for displaying a region for representing the project, in accordance with the received second ID of the project, in a portion of a display area; (d) a unit for retrieving, from the storage device in accordance with the first ID and the status information, an indicia corresponding to the status information, wherein the number of the indicia stored in the storage device is smaller than the number of types of the status information of the tools running in the factory so that at least one indicia being correlated to a plurality of status information; and (e) a unit for displaying, in said portion, the retrieved indicia.

The indicia may include a representation which represents at least two status information of the tools collectively.

Also, the indicia may include a graphic image which distinguishes the other indicia.

The system may display status information of every tool running in the factory in a single graphical user interface in the display.

These and other aspects of the present invention will be better appreciated and understood when considered in conjunction with the following description and the accompanying drawings, which are not necessarily drawn to scale.

DETAILED DESCRIPTION

Figure 1:
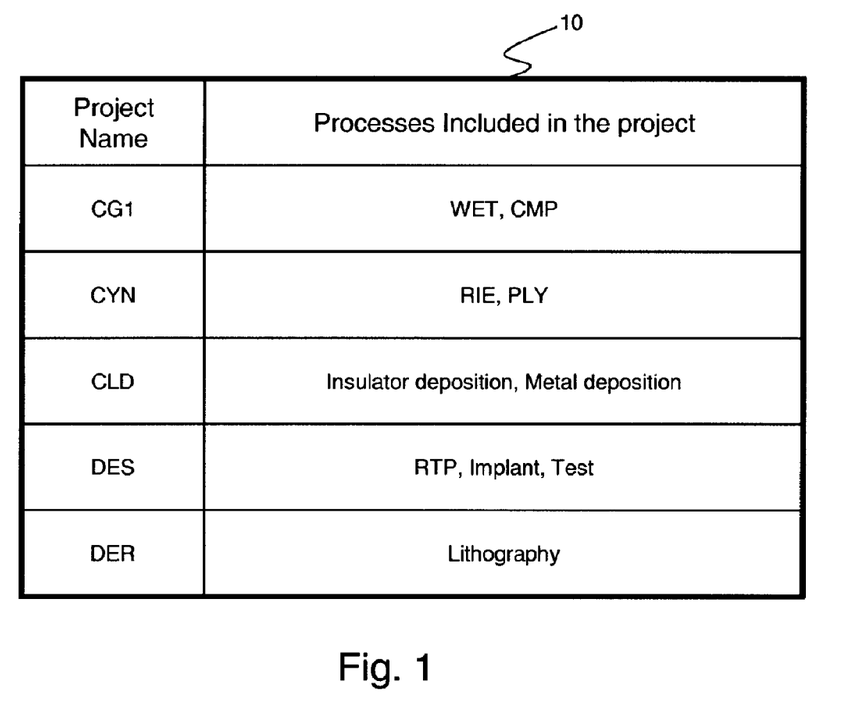
FIG. 1 illustrates a correlation between projects and processes supervised by the respective projects in accordance with an embodiment of the present invention.

Referring to FIG. 1, it will be explained how a semiconductor manufacturing facility 100 is organized and how the organization is reflected in a system in accordance with an embodiment of the present invention. FIG. 1 illustrates a correlation 10 between projects and processes supervised by the respective projects, stored in a first server in accordance with an embodiment of the present invention.

The process identifiers, such as WET, CMP, RIE, PLY, Insulator deposition, Metal deposition, RTP, Implant, Test1, Test2, Test3 and Lithography, are generic terms which collectively represent steps applied to semiconductor devices during their manufacturing in the facility. The details of each process itself are well known to those skilled in the art. Each process employs one or more manufacturing tools.

On the other hand, the projects are grouped into several projects for supervising.

Accordingly, the manufacturing tools in the manufacturing facility are managed with respect to the separate projects through the processes.

Figure 2:
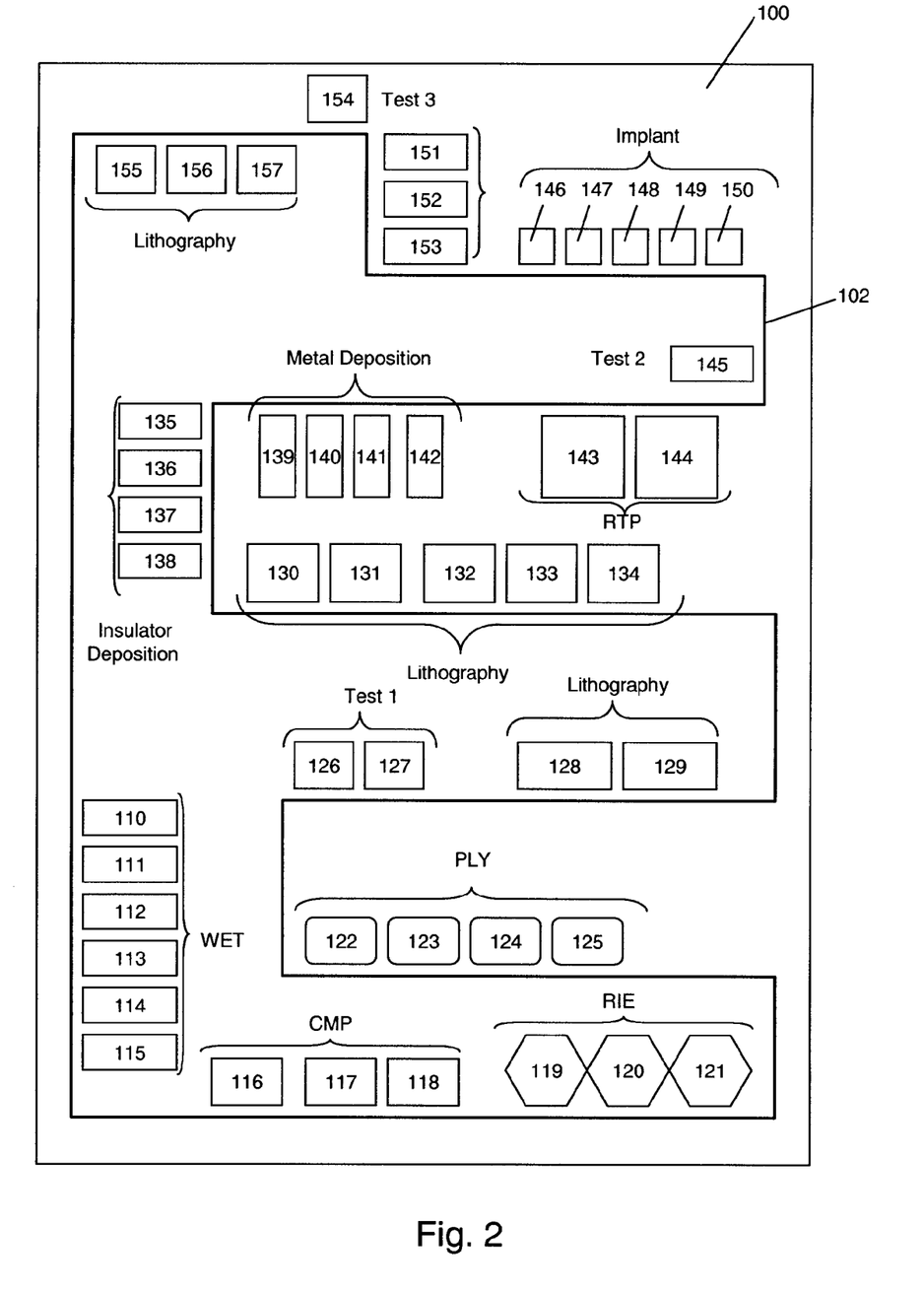
FIG. 2 shows arrangements of manufacturing tools in a semiconductor manufacturing facility.

FIG. 2 shows an arrangement of manufacturing tools in the semiconductor manufacturing facility. Each manufacturing tool 110–157 is located in the semiconductor manufacturing facility 100 along with an automatic conveying line 102. A group of semiconductor wafers are loaded on a carrying boat which moves on the automatic conveying line 102. In the manufacturing facility 100, a plurality of carrying boats are dispatched and controlled by a centralized tracking system to bring the boat in front of the respective tools. Then, the semiconductor wafers are loaded on/off the tools. Accordingly, desired semiconductor processes are applied in predetermined order to complete the semiconductor wafers.

For a given process, several similar manufacturing tools may be provided to allow parallel processing of a plurality of wafers. For example, for the WET process, the same manufacturing tools 110, 111, 112, 113, 114, 115 are provided. Alternatively, these tools may differ from each other. This means that, according to the embodiment of the present invention, manufacturing tools which belong to a process are collectively recognized regardless of differences of details in specifications among them.

Each process may include sub-processes. For example, Test process includes three sub-processes, Test 1, Test 2 and Test 3. Manufacturing tools which belong to the sub-processes are collectively recognized through the generic process Test and supervised in the corresponding project DES as illustrated in FIG. 1.

Figure 3:
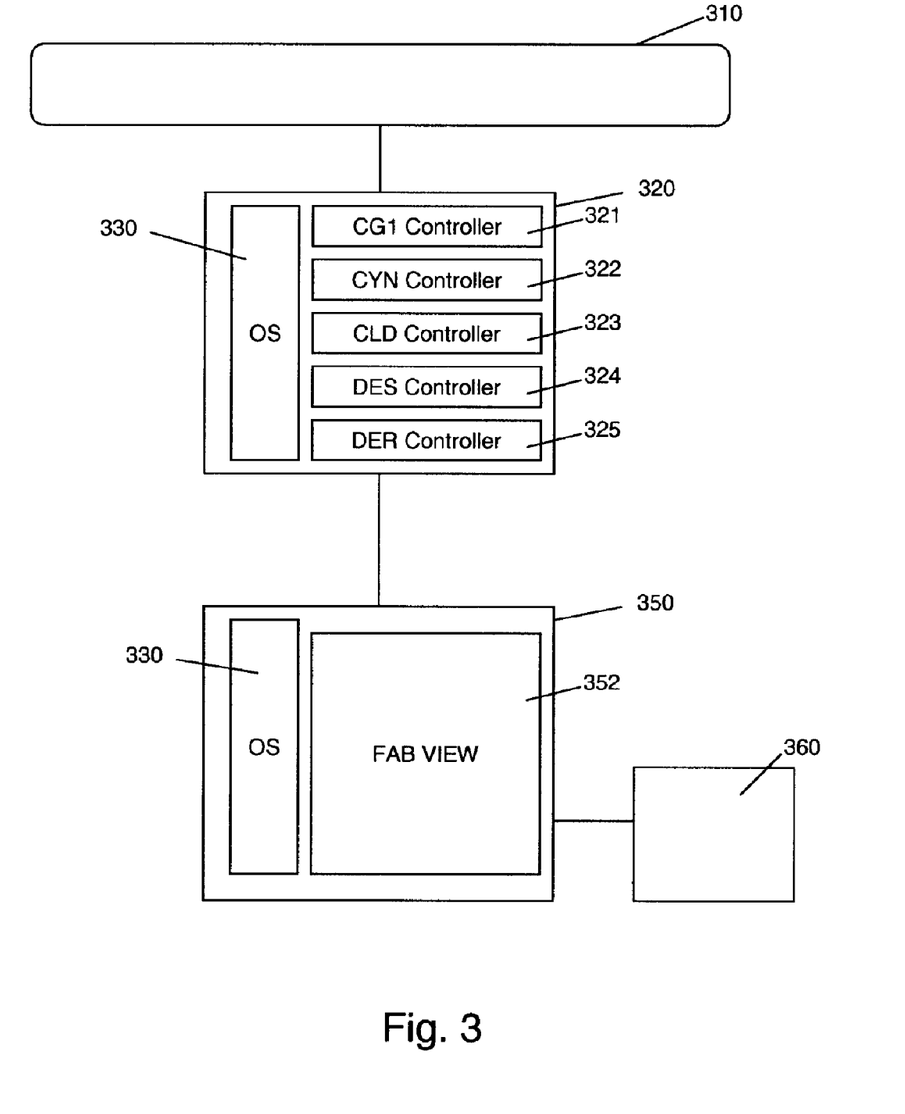
FIG. 3 shows a block diagram of a system for supervising manufacturing tools in accordance with an embodiment of the present invention.

FIG. 3 shows a block diagram of a system for supervising manufacturing tools in accordance with an embodiment of the present invention.

The manufacturing tools located in the semiconductor manufacturing facility 100 are connected to a communication network 310 such as a local area network (LAN). A first server 320 is connected with the communication network 310. The first server 320 may be an IBM eServer® BladeCenter™ JS20. An operating system 330 such as AIX™ is loaded on the first server. On the operating system, applications 321, 322, 323, 324, 325, for supervising the respective projects are running. The first server 320 is further connected to a second server 350.

The second server 350 is also equipped with an operating system 330. On this operating system, an application program 352, for monitoring the status of the manufacturing tools 110–157, operates. Hereinafter, this application program will be called Fabview. The second server 350 is connected to a display monitor 360 for displaying outputs from the Fabview 352.

Although the applications 321–325, Fabview 352 and the above-described correlation are operated in separate servers for the sake of convenience, a skilled artisan would understand that these also may be loaded and operated in a single server.

Figure 4:
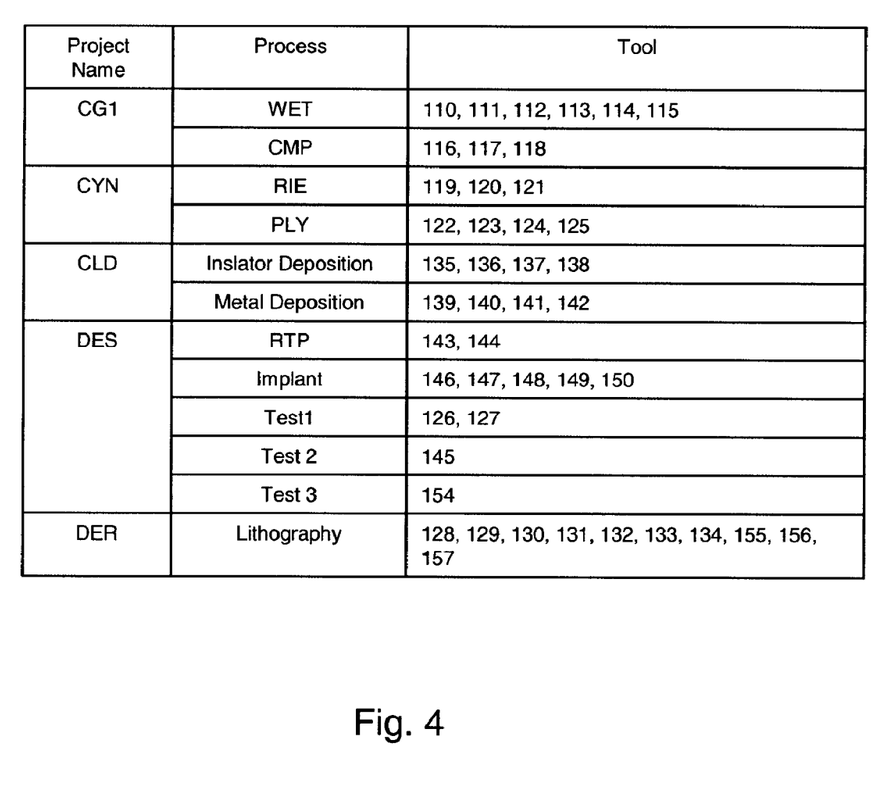
FIG. 4 shows a project-process-tool table in accordance with an embodiment of the present invention.

FIG. 4 shows a project-process-tool table in accordance with an embodiment of the present invention. The table includes relation between a project name, processes supervised by the project and tools employed in the processes. The project-process-tool table is stored in the second server 350 to allow access from the Fabview.

Figure 5:
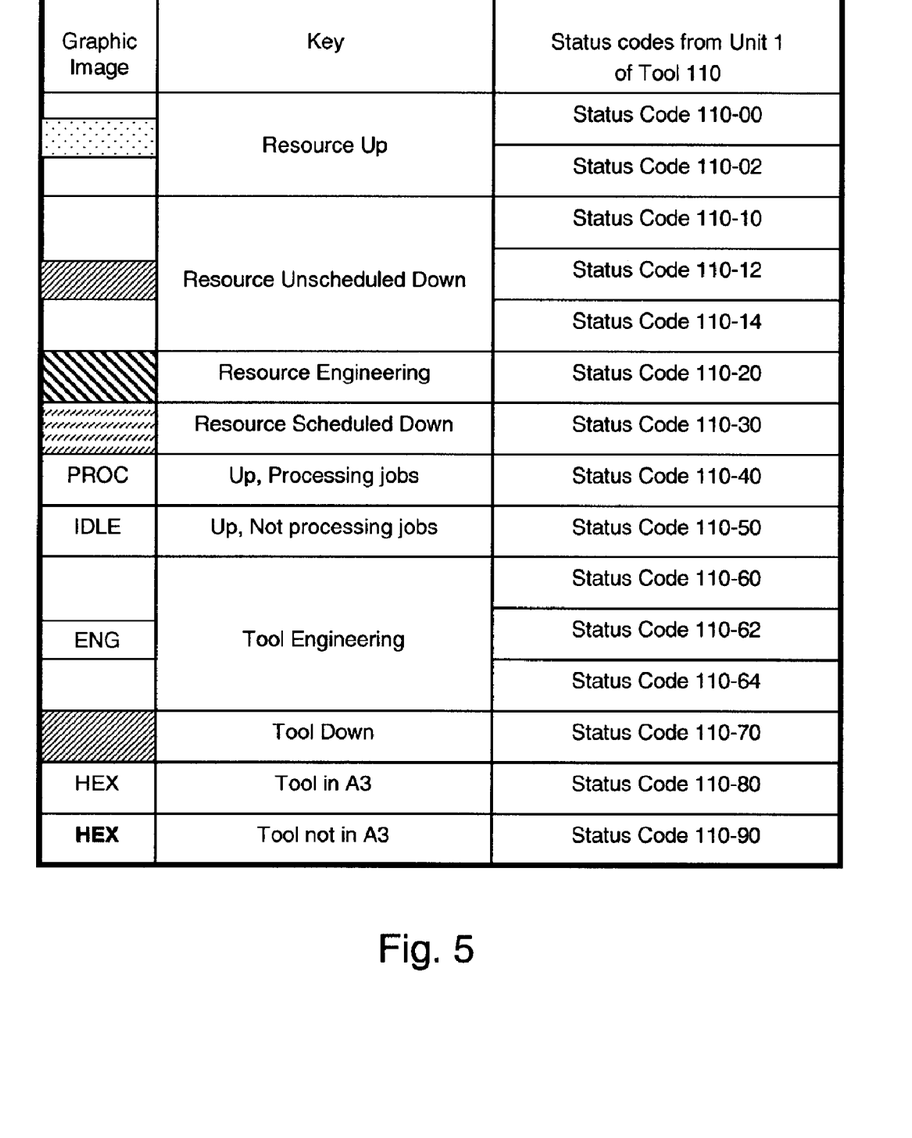
FIG. 5 shows an image-key-status code table in accordance with an embodiment of the present invention.

FIG. 5 shows an image-key-status code table in accordance with an embodiment of the present invention. As illustrated in FIG. 5, fifteen statuses, represented by status codes 110-00, 110-02, etc. are detected in a unit No. 1 of a manufacturing tool 110 for the WET process. For example, status codes 110-10, 110-12, 110-14 represent failure of the unit by a first error detected by a first sensor, a second error detected by a second sensor and a third error detected by a third sensor respectively.

Status codes 110-00 and 110-02 are correlated with a key "Resource Up" and with a graphic image (dotted block). Also, other status codes are correlated with the corresponding keys and graphic images as illustrated in FIG. 5. To distinguish the keys clearly, the graphic images preferably include different colors or patterns. The key is a collective representation of similar statuses of the unit 1 of the manufacturing tool 110.

In this way, each status observed in the manufacturing tool 110 is correlated to one of ten keys and graphic images. The respective keys have meanings as follows:

"Resource Up": Tool (or a unit of a tool) is in a state where it can accept product.

"Resource Unscheduled Down": Tool is down for some unscheduled reason.

"Resource Engineering": Engineering has control of the tool. Tool is not running.

"Resource Scheduled Down": Tool is down for scheduled work.

"Up, Processing jobs": Tool is processing jobs.

"Up, Not processing jobs" Tool is running, but it is not processing jobs.

"Tool Engineering": Tool is under engineering.

"Tool Down": Tool is down.

"Tool in A3" Tool is in full automation.

Similarly, other manufacturing tools generally have internal status codes. Depending on the types or manufactures of manufacturing tools, definitions of these status codes may differ.

In the image-key-status code table of FIG. 5, relations between the graphic images, keys and status codes are defined with respect to every machine tool 110-157 so that every status code which comes from a machine tool can be related to the ten keys. The image-key-status code table is stored in the second storage device in the second server 350.

Figure 6:
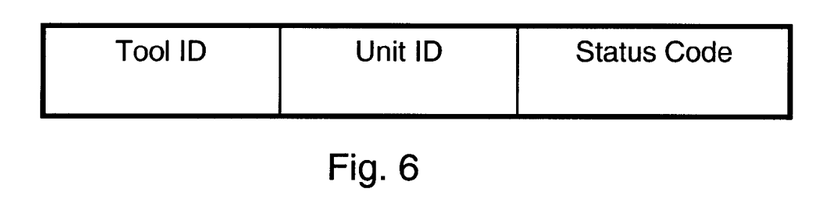
FIG. 6 illustrates general expression of data included in information sent from manufacturing tools.

FIG. 6 illustrates a general expression of data included in information sent from manufacturing tools. The manufacturing tools 110-157 are capable of outputting information including at least their own IDs, unit IDs which are included in the tools, and data representing the status of the units although the format of the information may differ between the manufacturing tools. If a manufacturing tool includes a plurality of units, the information may include unit IDs and status codes corresponding to the respective units.

Figure 7:
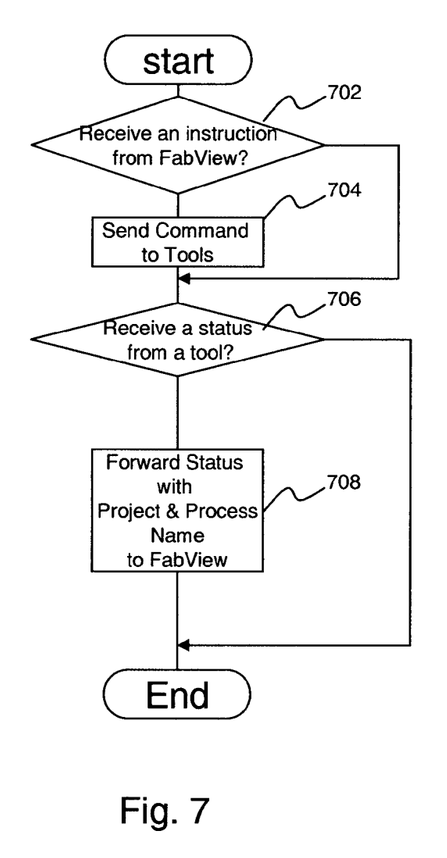
FIG. 7 shows a flow chart including processes performed by project controllers in a first server in accordance with the embodiment of the present invention.

FIG. 7 shows a flow chart including steps performed by project controllers 321, 322, 323, 324, 325 in a first server in accordance with the embodiment of the present invention. The project controllers perform the steps periodically.

When an instruction from Fabview 352 for collecting the status of units included in a specific manufacturing tool is received (step 702) by the CG1 controller 321, for example, a command is sent to the manufacturing tool (step 704). After receiving a response from the manufacturing tool (step 706), the CG1 controller 321 forwards the response from the tool to Fabview (step 710).

Figure 8:
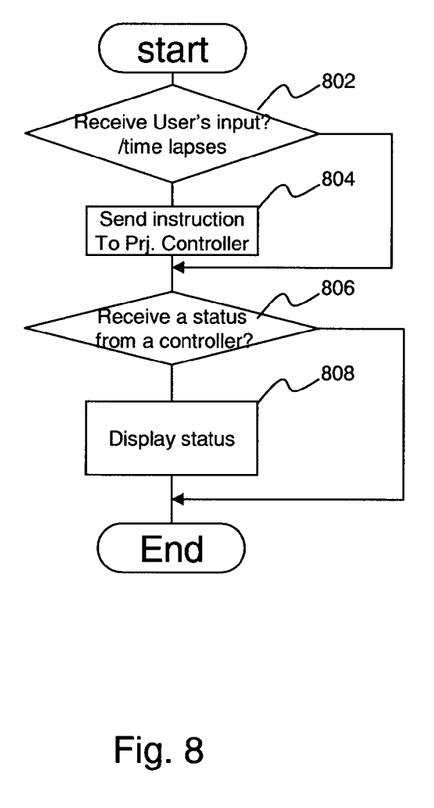
FIG. 8 shows a flow chart including processes performed by an application program for monitoring tool status, in accordance with the embodiment of the present invention.

FIG. 8 shows a flow chart including steps performed by Fabview 352 in accordance with the embodiment of the present invention. Fabview 352 performs the steps periodically.

When a user's input is received for refreshing a Fabview's display (described later), or a predetermined time period lapses (step 802), the instruction for collecting the status of units in a manufacturing tool is sent to the first server 320 (step 804).

After receiving the response from the manufacturing tool together with the project name and the process name (step 706), Fabview 352 searches a graphic image in the second correlations saved in the second storage in the second server in accordance with the received manufacturing tool ID, and displays the graphic image on the display monitor 360 (step 808). The details of the displaying step will be explained below.

Figure 9:
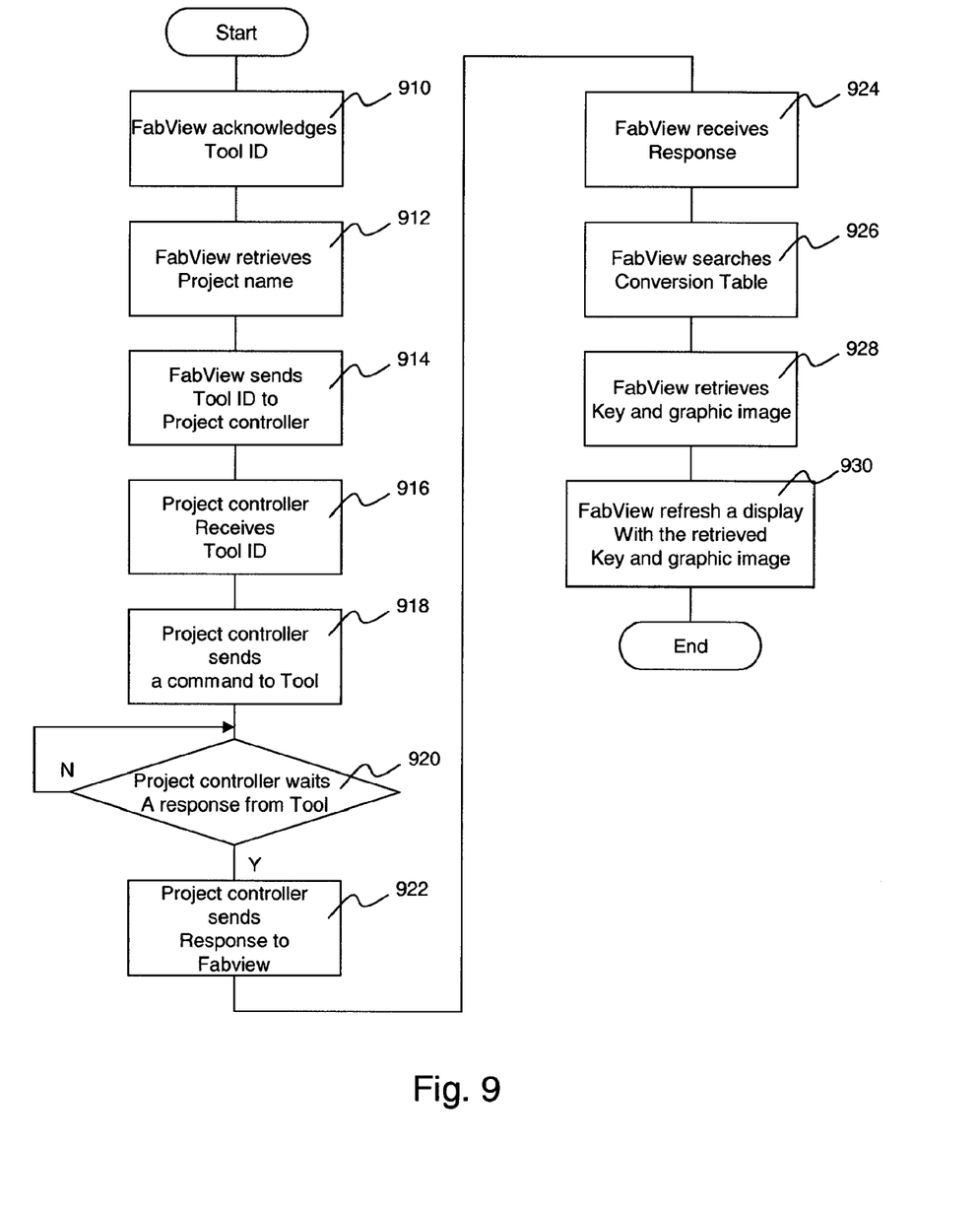
FIG. 9 illustrates a flowchart including processes for refreshing a display of the output of the application program.

Referring to FIG. 9, it will be described how Fabview obtains tool's status and displays the status on the display 360.

Assume that a user designates a tool, through a user interface of Fabview 352, to refresh the status of the tool on the display 360. Fabview 360 acknowledges the tool (step 910). Then Fabview 352 searches the project-process-tool table (FIG. 4) stored in the second server 350 with an ID of the tool as a search key to retrieve a project name (step 912). Fabview 352 sends the tool ID to a project controller which manages the project (step 914).

In the first server 320, the project controller receives the tool ID from Fabview 352 (step 916), then send a command for inquiring the status of the tool (step 918).

When the project controller receives a response from the tool (step 920), it forwards the response to Fabview 352. The content of the response includes the information as described referring to FIG. 6.

Fabview receives the response (step 924) and searches the image-key-status code table with the tool ID (and unit ID if any) and status code as searching keys (step 926) to retrieve an image and a Key (step 928).

Then Fabview displays the retrieved Key and the image with respect to the tool (step 930).

Figure 10:
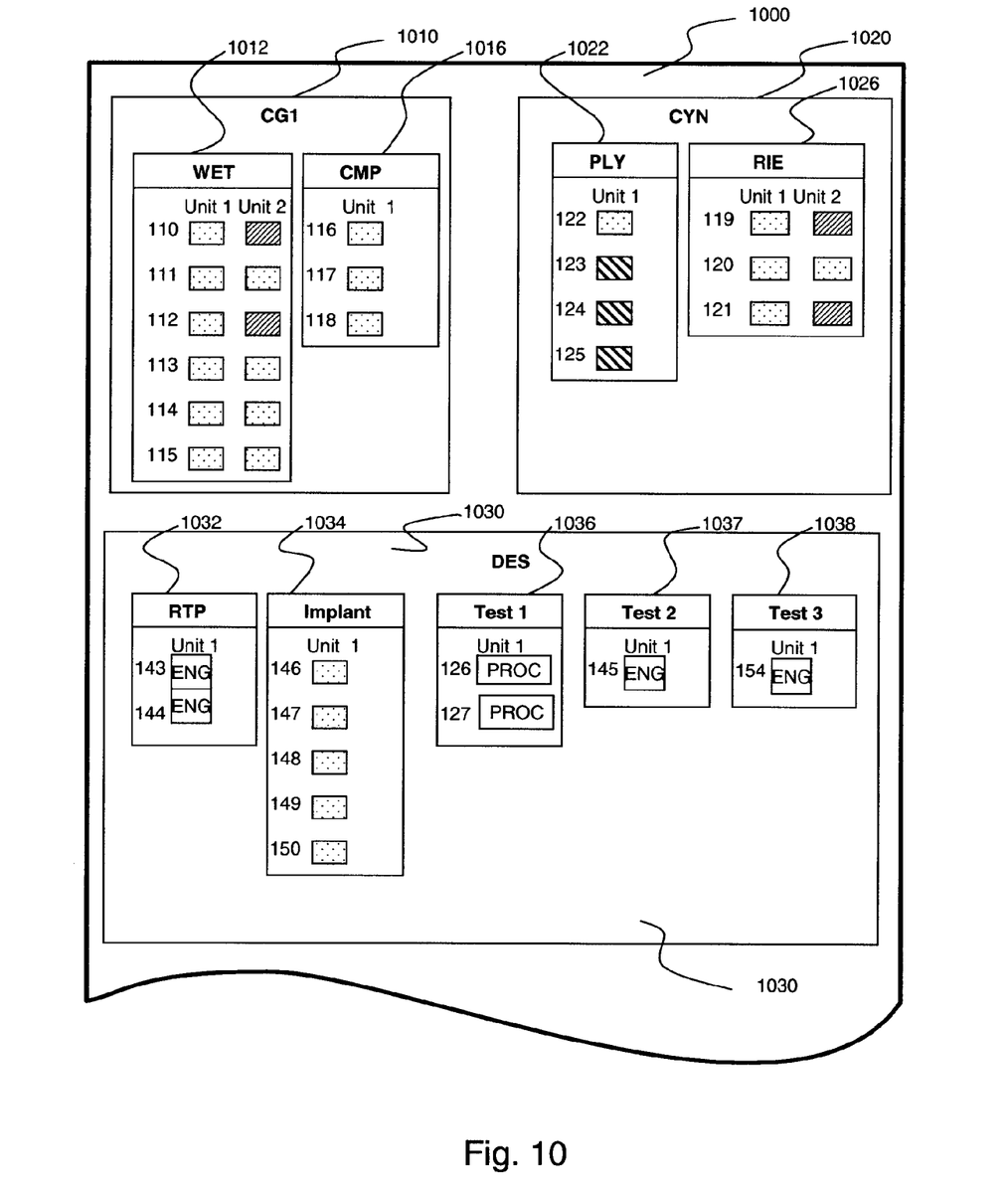
FIG. 10 illustrates a screen image displayed by the system in accordance with the embodiment of the present invention.

FIG. 10 illustrates a screen image displayed by Fabview in accordance with the embodiment of the present invention. In a portion of the overall display area 1000, the status of units of manufacturing tools in the semiconductor manufacturing facility 100 are displayed with respect to corresponding projects and processes. For simplicity, only a part of display area 1000 is illustrated. The display area may be divided into several parts to be displayed in different windows. However, it is understood by those skilled in the art that a user can comprehend the whole area by switching windows, for example. That is, Fabview provides the user a single graphic user interface to allow easy recognition of the status of tools employed in a factory.

Display regions (sub-portions of area 1000) for projects CG1, CYN, DES are displayed in a single display region 1020. Regions for other projects illustrated in FIG. 1 are also displayed (not shown).

In the respective regions for the projects, regions for processes, 1012, 1016, 1022, 1026, 1032, 1034, 1036, 1037, 1038 which are supervised by the projects in accordance with the correlation saved in the first server are displayed.

In the regions for the projects, graphic images are displayed which correspond to the status of units included in manufacturing tools which are employed by the respective processes, in accordance with the correlation saved in the first server.

Also, the graphic images are displayed to be associated with names of units exhibiting the status and the names of manufacturing tools including the units.

For example, the project CG1 1010 involves the two processes WET 1012 and CMP 1016. For the WET process, manufacturing tools 110–115 are provided in the semiconductor manufacturing facility 100. The respective manufacturing tools 110–115 include sub components named Unit 1, Unit 2. Unit 2 of the tool 110 and Unit 2 of the tool 112 are under the status of "Scheduled Down." Other units of the tools are all in "Resource Up" states.

As illustrated in FIG. 10, Fabview 352 receives the status of units of manufacturing tools, converts each status into a predetermined corresponding status and displays the status with graphic images on preferably a single display monitor so that an operator of Fabview can comprehend the status of the various manufacturing tools immediately, even if the status reporting format in the respective manufacturing tools are different from each other.

In accordance with the embodiment of the present invention, manufacturing tools operated in a manufacturing facility can be monitored and managed in cross-product-line fashion, along with projects which supervise a group of processes which employ the tools.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A system for displaying status of individual tools running in a factory, comprising:
    (a) a unit for receiving information via an electronic signal directly from a tool, the information including a first ID of the tool and a status information of the tool;
    (b) a unit for retrieving, from a storage device in accordance with the first ID, a second ID of a project under which the tool is supervised in the factory;
    (c) a unit for displaying an image corresponding to the project, in accordance with the received second ID of the project, in a portion of a display area;
    (d) a unit for retrieving, from the storage device in accordance with the first ID and the status information, indicia corresponding to the status information, wherein a number of the indicia stored in the storage device is smaller than a number of types of status information of the tools running in the factory so that at least one of the indicia is correlated to a plurality of status information; and
    (e) a unit for displaying, in said portion, the retrieved indicia.

2. The system according to claim 1, wherein the indicia include a graphic image which distinguishes other of the indicia.

3. The system according to claim 1, wherein status information of every tool running in the factory are displayed in a single graphical user interface in the display area.

4. A method for displaying status of individual tools running in a factory, comprising the steps of:
    (a) receiving information via an electronic signal directly from a tool, the information including a first ID of the tool and a status information of the tool;

(b) retrieving, from a storage device in accordance with the first ID, a second ID of a project under which the tool is supervised in the factory;

(c) displaying an image corresponding to the project, in accordance with the received second ID of the project, in a portion of a display area;

(d) retrieving, from the storage device in accordance with the first ID and the status information, indicia corresponding to the status information, wherein a number of the indicia stored in the storage device is smaller than a number of types of status information of the tools running in the factory so that at least one of the indicia is correlated to a plurality of status information; and (e) displaying, in said portion, the retrieved indicia.

5. The method according to claim 4, wherein the indicia includes a representation of a plurality of status information of the tools collectively.

6. The method according to claim 4, wherein the indicia include a graphic image which distinguishes other of the indicia.

7. The method according to claim 4, wherein status information of every tool running in the factory are displayed in a single graphical user interface in the display area.

8. A computer program product comprising a computer usable medium tangibly embodying computer readable program code means for displaying status of individual tools running in a factory, the computer program product comprising:

(a) code means for receiving information via an electronic signal directly from a tool, the information including a first ID of the tool and a status information of the tool;

(b) code means for retrieving, from a storage device in accordance with the first ID, a second ID of a project under which the tool is supervised in the factory;

(c) code means for displaying an image corresponding to the project, in accordance with the received second ID of the project, in a portion of a display area;

(d) code means for retrieving, from the storage device in accordance with the first ID and the status information, indicia corresponding to the status information, wherein a number of the indicia stored in the storage device is smaller than a number of types of status information of the tools running in the factory so that at least one of the indicia is correlated to a plurality of status information; and (e) code means for displaying, in said portion, the retrieved indicia.

9. The computer program product according to claim 8, wherein the indicia includes a representation of a plurality of status information of the tools collectively.

10. The computer program product according to claim 8, wherein the indicia include a graphic image which distinguishes other of the indicia.

11. The computer program product according to claim 8, wherein status information of every tool running in the factory are displayed in a single graphical user interface in the display area.

* * * * *